(12) United States Patent
Ungar et al.

(10) Patent No.: US 8,689,148 B1
(45) Date of Patent: Apr. 1, 2014

(54) REGULARIZATION METHOD FOR QUANTIZING LITHOGRAPHY MASKS

(75) Inventors: P. Jeffrey Ungar, Sunnyvale, CA (US); Ilhami H. Torunoglu, Monte Sereno, CA (US)

(73) Assignee: Gauda, Inc., Palo Alto, CA (US)

( * ) Notice: Subject to any disclaimer, the term of this patent is extended or adjusted under 35 U.S.C. 154(b) by 0 days.

(21) Appl. No.: 13/425,324

(22) Filed: Mar. 20, 2012

Related U.S. Application Data

(63) Continuation of application No. 12/777,940, filed on May 11, 2010, now Pat. No. 8,141,004, which is a continuation of application No. 11/864,381, filed on Sep. 28, 2007, now Pat. No. 7,716,627.

(60) Provisional application No. 60/827,295, filed on Sep. 28, 2006.

(51) Int. Cl.
*G06F 17/50* (2006.01)

(52) U.S. Cl.
USPC .................................................. 716/50

(58) Field of Classification Search
USPC ............................................. 716/100, 50
See application file for complete search history.

(56) References Cited

U.S. PATENT DOCUMENTS

| | | | |
|---|---|---|---|
| 5,326,659 A | 7/1994 | Liu et al. | |
| 5,527,645 A * | 6/1996 | Pati et al. | 430/5 |
| 5,701,365 A | 12/1997 | Harrington et al. | |
| 6,518,180 B1 | 2/2003 | Fukuda | |
| 6,611,953 B1 | 8/2003 | Filseth et al. | |
| 7,266,803 B2 | 9/2007 | Chou et al. | |
| 8,141,004 B1 * | 3/2012 | Ungar et al. | 716/50 |
| 2006/0120618 A1 * | 6/2006 | Mizoguchi | 382/255 |
| 2006/0248495 A1 * | 11/2006 | Sezginer | 716/19 |
| 2007/0031745 A1 | 2/2007 | Ye et al. | |
| 2007/0124708 A1 | 5/2007 | Torres Robles et al. | |
| 2007/0198963 A1 * | 8/2007 | Granik et al. | 716/19 |
| 2008/0046846 A1 | 2/2008 | Chew et al. | |
| 2009/0075183 A1 | 3/2009 | Cecil | |
| 2010/0082717 A1 * | 4/2010 | Mogi et al. | 708/203 |

* cited by examiner

*Primary Examiner* — Suchin Parihar
(74) *Attorney, Agent, or Firm* — Aka Chan LLP

(57) ABSTRACT

In an electronic design automation technique for optical proximity correction, an optimized mask function that has values other than those allowed for a particular mask type, such as 0 and 1 for a chrome-on-glass binary mask, evolves it to a solution restricted to these values or narrow intervals near them. The technique "regularizes" the solution by mixing in a new cost functional that encourages the mask to assume the desired values. The mixing in may be done over one or more steps or even "quasistatically," in which the total cost functional and the mask is brought from pure goodness-of-fit to the printed layout for given conditions to pure manufacturability by keeping the total cost functional minimized step-by-step. A goal of this gradual mixing-in is to do thermodynamically optimal work on the mask function to bring it to manufacturable values.

20 Claims, 4 Drawing Sheets

REGULARIZATION METHOD FOR QUANTIZING LITHOGRAPHY MASKS

CROSS-REFERENCE TO RELATED APPLICATIONS

This patent application is a continuation of U.S. patent application Ser. No. 12/777,940, filed May 11, 2010, issued as U.S. Pat. No. 8,141,004 on Mar. 20, 2012, which is a continuation of U.S. patent application Ser. No. 11/864,381, filed Sep. 28, 2007, which claims the benefit of U.S. provisional patent application 60/827,295, filed Sep. 28, 2006, which are incorporated by reference along with all other references cited in this application.

BACKGROUND OF THE INVENTION

This invention relates to the field of electronic design automation, and in particular, improved techniques for photolithography mask design.

Lithography mask optimization methods either force the mask to satisfy a priori mask manufacturability constraints at all times or use the "regularization" procedures of "inverse methods" to favor solutions that satisfy these constraints. More generally, there can be some constraints built into the mask representation or optimization algorithm and others handled through regularization procedures. Conceptually, an optimization algorithm can be more efficient in terms of speed and quality of solution by searching an unconstrained solution space, using regularization to guide the search to more desirable masks, than by searching in a heavily constrained space where one point may not be reachable from another in any straightforward way.

Many "inverse lithography" methods represent the mask using continuous tones that must be regularized to assume allowable mask values. For example, a chrome-on-glass mask can only have transmission values of one or zero. For this case, the usual simplistic regularization procedure is to add a term to the cost function that favors these values over others, and perhaps perform a threshold operation on the result to fully quantize the mask. By way of example, a term that could be used to accomplish this would be:

$$U = 16\, m^2 (1-m)^2$$

where m is the mask amplitude transmission value as a function of position and the total cost is obtained by integrating U over the mask area. This form of U has minima at m=0 and m=1, and a maximum of 1 at m=½. Unfortunately, if the term is given too much weight, the mask obtained will be close to a quantized mask but may not print well, and if it is given too little weight, it will not be sufficiently close to a quantized mask, and so will not print well after a threshold is applied. Worse still, there may not be any fixed term that will yield an acceptable mask.

The fundamental problem is that a sizeable area of low transmission value against a dark background may need to be represented by a narrow feature of full transmission value, which will require the solution to climb too big a hill in the regularization term. The opposite case can also occur, namely, where there is a sizeable area of somewhat less than full transmission within a fully transmitting region that needs to be represented as a narrow feature of zero value.

(Assuming there were no other mask criteria, one could use half-toning techniques to convert the "gray scale" mask to a quantized mask, but this will have the undesirable effect of introducing many small shapes, which is not suitable for current mask technology.)

What is needed is a regularization procedure and formulation that can bring a continuous tone mask to a quantized mask that prints similarly well.

BRIEF SUMMARY OF THE INVENTION

The invention takes an optimized mask function that has values other than those allowed for a particular mask type, such as 0 and 1 for a chrome-on-glass binary mask, and evolves it to a solution restricted to these values or narrow intervals near them.

The invention "regularizes" the solution by mixing in a new cost functional that encourages the mask to assume the desired values. The mixing in may be done over one or more steps or even "quasi-statically," in which the total cost functional and the mask is brought from pure goodness-of-fit to the printed layout for given conditions to pure manufacturability by keeping the total cost functional minimized step-by-step. The aim of this gradual mixing-in is to do thermodynamically optimal work on the mask function to bring it to manufacturable values.

The invention mixes-in a regularization functional that may depend on the mask itself in some fixed, self-consistent, or otherwise changing way as the mask evolves to a quantized state. The idea is that any value not close to an allowed value needs to move away from where it is without any particular bias as to what direction it goes until it is very close to a quantization level.

In one embodiment, a cost functional term places a cost maximum locally at intermediate current mask values so they will be unstable and tend to "roll" downhill towards an allowed value on either side of the hill. The new cost functional term can also favor allowed values by having local minima at these values. Intermediate mask values very close to an allowed value may instead be pushed toward the nearest allowed value by placing the hill on the far side.

In one embodiment, the invention undertakes multiple steps where the quantizing functional becomes a larger fraction of the total cost functional and where the hills placed underneath intermediate values are adjusted to chase them to any allowed value. The mask function is thus brought to quantized values in a controlled and optimal way.

In an embodiment, the invention is a method including processing an analytical function for a mask region using a cost function, wherein the cost function is biased using any bias value in a range; and processing a plurality of analytical functions mask regions using the cost function. In various implementations, for example, the bias value is not a middle value (e.g., 0.5 in a range from 0 to 1). In an implementation, the bias value is greater than 0.5 and less than 1. In an implementation, the bias value is less than 0.5 and greater than 0. Further, in an implementation, when processing a plurality of analytical functions mask regions using the cost function, the bias value changes or varies for cost function used for each mask regions, so not the same bias value is used. The bias value may changes depending on the conditions.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
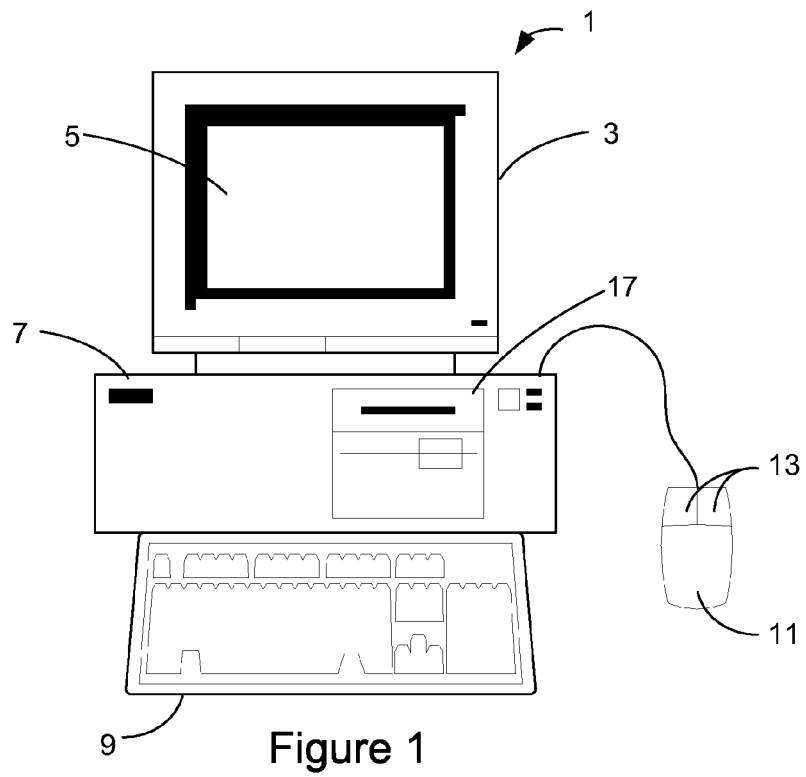
FIG. 1 shows a system of the present invention for performing electronic design automation using a graphics processor.

FIG. 1 shows a system of the present invention. In an embodiment, the invention is software that executes on a computer workstation system, such as shown in FIG. 1. FIG. 1 shows a computer system 1 that includes a monitor 3, screen 5, cabinet 7, keyboard 9, and mouse 11. Mouse 11 may have one or more buttons such as mouse buttons 13. Cabinet 7 houses familiar computer components, some of which are not shown, such as a processor, memory, mass storage devices 17, and the like.

Mass storage devices 17 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
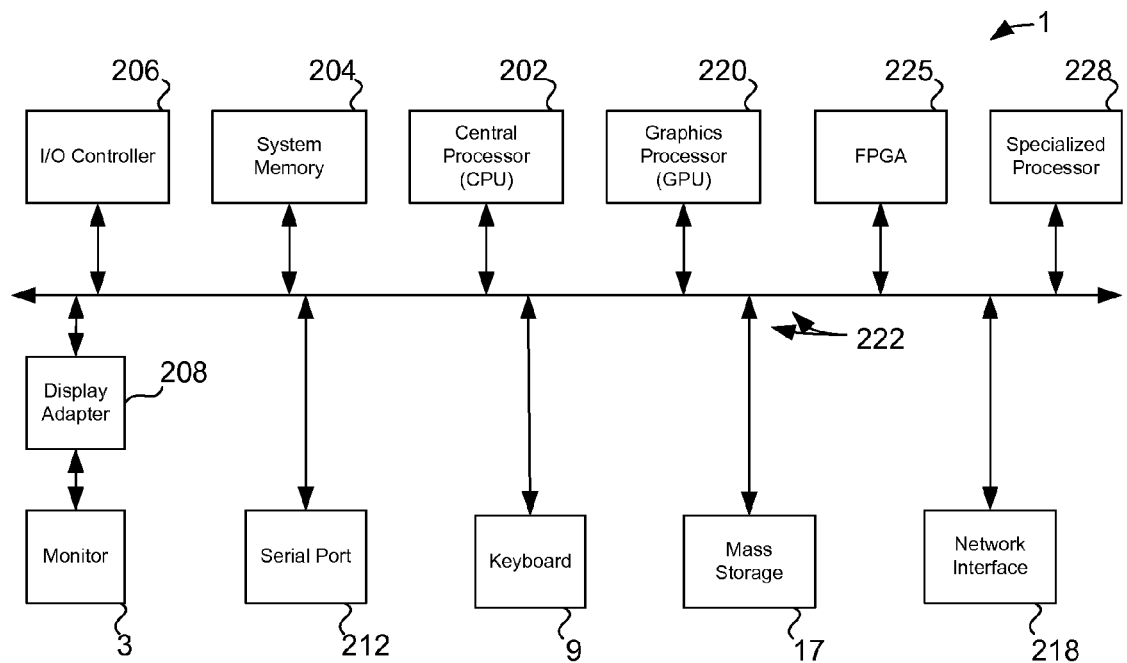
FIG. 2 shows a simplified system block diagram of a computer system used to execute software of the invention.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor (CPU) 202, system memory 204, input/output (I/O) controller 206, display adapter 208, serial or universal serial bus (USB) port 212, network interface 218, graphics processor (GPU) 220, FPGA 225, and specialized processor 228 (e.g., ASIC, physics processor). The invention may also be used with computer systems with additional or fewer subsystems. For example, a computer system could include more than one processor 202 or 220, or both. Such a system may be referred to as a multi-processor system. The system may include on-chip or external cache memory.

The computer system may include any number of graphics processors. The graphics processor may reside on the motherboard such as being integrated with the motherboard chipset. One or more graphics processors may reside on external boards connected to the system through a bus such as an ISA bus, PCI bus, AGP port, PCI Express, or other system buses. Graphics processors may on separate boards, each connected to a bus such as the PCI Express bus to each other and to the rest of the system. Further, there may be a separate bus or connection (e.g., Nvidia SLI or ATI CrossFire connection) by which the graphics processors may communicate with each other. This separate bus or connection may be used in addition to or in substitution for system bus.

Each processor, CPU or GPU, or both, may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 1. However, these arrows are illustrative of any interconnection scheme serving to link the subsystems. For example, speaker 220 could be connected to the other subsystems through a port or have an internal connection to central processor 202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, MatLab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64, or combinations of these. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Mask Design Through Inverse Lithography with Spatial Frequency Analysis

Production-scale chip manufacturing uses photolithographic techniques to build up layers of materials on a wafer to create the transistors, wires, and so on, that realize a chip design. The sizes of the features to be printed on the wafer are approaching the limits set by the wavelength of the light, the optical projection system, and the behavior of the light sensitive materials used, among many other factors.

Diffraction effects from the wavelength of the light source and the limits of the projection optics motivated the development of optical proximity correction (OPC) techniques to adjust the shapes on the mask to print more like the desired result on the wafer. For example, a square may have serifs added to its corners to compensate for excessive rounding of the corners of the printed feature, or the ends of a rectangle may have "hammerheads" added to further ensure the printed feature reaches the desired line end.

The first OPC methods were based on simple rules for modifying the shapes on the mask, but as the technology was pushed closer to optical resolution limits, model-based optimization, which adjusts the features on the mask to improve the calculated printed image, was developed. Two significant advantages of model-based OPC are the ability to account for proximity effects (warping a nearby feature will affect how a given feature prints) and to accommodate photoresist behavior.

Sometimes, features are found to print with greater fidelity if extra features are added to the mask that are too small to print themselves, but nevertheless favorably affect the way nearby main features print. Introduction of these so-called subresolution assist features (SRAFs) is still generally done according to preset rules. Typically they are inserted first and held fixed as OPC is applied to the main features on the mask.

There are significant problems in applying these methods as the industry moves to ever smaller on-wafer dimensions. The rules used to insert SRAFs are becoming more complex and less reliable. The standard OPC methods do not have the flexibility needed to achieve the best results and require post-OPC verification and manual intervention.

What is needed is a practical model-based inverse lithography method that can automatically determine a mask that both satisfies mask manufacturing and verification criteria, and produces the desired print on the wafer over a range of process conditions, such as exposure and focus variation. Such a method will generally result in a mask that warps existing layout geometry and adds or subtracts SRAFs from anywhere, including in ways that split or join the layout features.

Typically, inverse lithography methods have pixelized the mask transmission values. The mask pixels are then adjusted to optimize the computed print in the photoresist as well as some measure of mask design "goodness." For example, the mask pixel values may be constrained to be fully transmitting (1) or absorbing (0) to produce a chrome-on-glass binary mask, or if not fully constrained, the optimization procedure may be tuned to strongly favor these values. In the field of inverse theory, directing the solution to have desired a priori characteristics is known as regularization. Other regularization terms are often employed to affect the solution, such as measures that penalize complex structures.

In contrast to pixel-based methods, this invention represents the mask as a continuous function and uses the physics of optical projection to design the inverse solution based on a spatial frequency analysis. From a physics perspective, spatial frequencies above a cutoff determined by the optical system do not contribute to the projected image.

Frequencies below this cutoff affect the print (and the mask), while those above the cutoff only affect the mask.

We represent the mask in a basis set that automatically exposes the separation between the low frequencies that affect the print and the high frequencies that only adjust the mask. The planewave (Fourier) basis makes this separation perfectly, but other basis sets such as wavelets may be used.

The first stage in optimizing the mask function seeks a continuous tone solution that is clamped to the minimum and maximum allowable mask values. For a binary mask, this means that a regularizing cost functional is added to a functional that measures the goodness of the predicted printed features to prevent the mask values from straying outside of the interval [0, 1]. We include spatial frequencies up to some multiple of the cutoff to accommodate this clamping.

The output of this stage will have produced an optimal clamped solution for the various criteria included in the fitting functional. These may include terms that measure variation with exposure (dose), depth of focus, or that weight different parts of the printed image according to the needs of the design.

The solution obtained needs to be pushed further to be quantized to the allowable mask values, such as 0 and 1 for a binary mask. This is accomplished through another idea.

Mask design through "inverse lithography" using separation of spatial frequencies to control printed image versus mask manufacturability.

Typical inverse lithography methods pixelize the computed aerial image and the mask values under optimization on a dense spatial grid. The mask pixel values are adjusted to optimize both the computed print in the resist and some measure of mask "goodness" (which is known as regularization in "inverse theory"). For example, the mask transmission values may be constrained to be 0 or 1, or at least strongly favor these values in a solution, or a measure of the solution's complexity may be minimized to avoid complex, "snowflake" structures.

The regularization is used because the inverse problem (what mask will print a desirable image) is severely under-constrained—many masks will print essentially the same image, so other criteria must be used to select appropriate solutions. From a physics perspective, spatial frequencies above a cutoff determined by the optical system do not contribute to the projected image; therefore, frequencies below this cutoff affect the print (and the mask), while those above only affect the mask.

A computer-implemented method of the invention includes: representing the mask values in different basis sets with a view to exposing automatically the separation between the low frequencies that affect the print and the high frequencies that only adjust the mask. The Fourier basis provides the separation perfectly, but others such as various wavelet representations can be used.

A given (desirable) printed image must result from a band-limited aerial image (which is all the optical system can form), but there may be many such images that would work. The method regularizes this reduced solution further by favoring real-space mask pixels with values in (0.1), wider "process windows" (solution sensitivity to exposure and defocus), and so forth.

Taking the forward view, the system will print from a band-limited aerial image, so one may preprocess the ideal resist print (round the corners, and so forth) to be a better match to what is achievable to begin with, and actually construct an aerial image to achieve.

In either case, the high frequency coefficients may then be adjusted while holding the low frequency values constant or otherwise forced close to their original values to optimize the mask manufacturability.

Quasi-Static Regularization for Mask Manufacturability

Continuous-tone mask functions that solve the inverse lithography problem are quantized to allowable values; for example, 0 or 1 for a binary chrome-on-glass mask.

Starting with an optimized mask function, such as a continuous tone, clamped solution utilizing another invention, we slowly mix in a new cost functional to further regularize the solution. The mixing in may be done "quasi-statically" to bring the cost functional and the mask from pure goodness-of-fit to printed layout and process characteristics to pure manufacturability by keeping the total cost functional minimized step-by-step. The aim of this gradual mixing in is to do thermodynamically optimal work on the mask function to bring it to manufacturable values.

The functional we mix in to push the intermediate mask values to the allowable values may depend on the mask itself in some fixed, self-consistent, or otherwise changing way. The idea is that any value not close to an allowed value needs to move away from where it is without any particular bias as to which direction it goes.

One way to accomplish this is for the new cost functional term to place an energy maximum locally at intermediate current mask values to cause them to "roll" downhill towards an allowed value on either side of the hill. The new functional can also favor allowed values by having local minima at these values. Intermediate mask values very close to an allowed value may instead be pushed toward the nearest allowed value by placing the hill on the far side.

By doing multiple steps where the quantizing functional becomes a larger fraction of the total cost functional and where the hills placed underneath intermediate values are adjusted to chase them to any allowed value, the mask function is brought to quantized values in a controlled and optimal way.

A computer-implemented method of the invention includes: Start with optimized mask (perhaps continuous tone and phase, pixelized, or otherwise parameterized). Mix in a new cost to "regularize" the solution to be more desirable (e.g., to favor a binary mask, or others). Conceptually, adjust the mixing quasi-statically to bring the functional from pure goodness-of-fit to printed layout to pure manufacturability, keeping the total cost functional minimized step-by-step.

An objective is to do thermodynamically optimal (reversible) "work" on the solution to adjust to manufacturabilty.

Use spatial frequency separation described above to advantage.

U.S. patent application Ser. No. 11/864,343, filed Sep. 28, 2007 is incorporated by reference.

Inverse Lithography with Simplified Resist Model to Generate Assist Features for Traditional Model-Based Optical Proximity Correction Inverse lithography methods require substantial computing resources and may generate smooth, curvy features that need to be converted to rectilinear mask geometry. Traditional model-based OPC is fast and can use more sophisticated resist models, but cannot generate subresolution assist features (SRAFs) automatically and self-consistently.

Take a mask function optimized through inverse lithography, and use it as input to a traditional model-based OPC program. The inverse lithography process will provide the SRAFs and initial shapes, and the traditional OPC program can further correct and validate the results using better models.

A computer-implemented method of the invention includes: Use a simplified resist model that has an analytical functional form to do inverse modeling faster, but take the resulting mask (after modifying to be a set of shapes as for binary, PSM, EAPSM, or others, manufacturable masks), and optimize it using a traditional OPC program with a more complex resist model.

In this way, the extra mask features needed to print well are generated by the inversion, but then further corrected and validated by a program with access to better models (which may take more computational effort to use).

Fast Eigenfunction Decomposition of the Real Space Partially Coherent Transmission Operator Using High Resolution Fourier Space Grids Calculating projected images with partially coherent illumination can be done efficiently using an eigenfunction expansion of the Hopkins partial coherence operator. This expansion can be accomplished in real space or Fourier space. A naïve discretization of the illumination source and coherent transfer function of the optical projection system followed by matrix diagonalization is likely to be both inaccurate and computationally intensive, even if iterative, large-scale diagonalization schemes are used.

In this invention, we super-sample the illumination source and the coherent optical transfer functions in Fourier space to represent slim or circular shapes more accurately. We may also smooth the transition at the edges of these shapes to further symmetrize the calculated real space samples.

To accelerate the diagonalization of the real-space Hopkins partial coherence operator, we use the translational invariance of the mutual intensity illumination function to compute the matrix-vector product via element-wise multiplication and Fast Fourier Transforms (FFTs). To determine the eigenvectors with the largest eigenvalues (greatest contribution to the operator), only matrix-vector products are needed by solvers such as SVDPACK or ARPACK.

The operations count (when discretizing space on an n by n grid) for the matrix-vector product is reduced from $O(n^4)$ to $O(n^2 \log(n^2))$.

Representation and decomposition of the partially coherent transmission matrix in real-space with the effective source mutual intensity and the coherent amplitude point-spread transfer function represented on a high-resolution grid in Fourier space. A computer-implemented method of the invention includes:

1. Represent quantities on a real-space 2D grid (nx by ny). Transmission matrix will be on a (nx*ny) by (nx*ny) real space grid, assuming we flatten the 2D space to a single index. Diagonalize this (Hermitian) matrix to decompose (goal is to keep largets eigenvalue vectors only). Eigenvectors so obtained are the real-space "kernels."

The computational effort to do the diagonalization (or singular value decomposition) increases quickly with real-space grid resolution, being $O((nx*ny)^3)$. The resolution needed for a good representation is not too high, however, with n=nx=ny=64 being adequate and requiring only minutes to diagonalize.

2. The real-space transmission matrix is $$T(r1,r2)=J0minus(r1,r2)*K(r1)*conjugate(K(r2))$$

J0minus(,) is mutual intensity just before the mask
K( ) is coherent amplitude transfer function
r1, r2 coordinates of two real-space points.

It is typical for J0minus(r1,r2) to be a function of r1−r2 only (translational invariance). These quantities are conveniently specified in Fourier space; e.g., F {K}( ) is generally a (circular) low pass filter, and F {J0minus}( ) is essentially the illumination pattern (Kohler, Annular, QUASAR, or others).

These slim or circular shapes, or both, are represented on a square grid with enough resolution to capture their essential characteristics, but not exceed the transmission matrix diagonalization. One technique is to use a Fourier space grid that has many times more samples than the target real-space grid (while retaining the same frequency extents). This effectively just embeds the result in a real-space grid with larger extents, so the needed values are obtained by inverting the fine-Fourier-grid samples to real-space, and then retaining only the values within the target real-space grid cell.

If the Fourier-space grid resolution is an integral factor times greater, then after inversion the real-space values within the target real-space grid cell will lie on the target real-space grid points.

Light Source Optimization

The characteristics of the light source in a photolithography projection system have a significant effect on the quality of the resulting images printed on the wafer. These parameters may be optimized to print certain layers.

According to the invention, there are various approaches:

(1) Optimize a set of orthonormal functions and eigenvalues constrained to represent a valid Hopkins partial coherence operator to optimize the illumination source.

(2) Instead, optimize the mutual intensity function directly in Fourier space or real space taking advantage of small perturbations yielding small variations in any eigenfunction decomposition.

(3) Optimize the light source directly using Abbe's method of statistically independent ray bundles.

A computer-implemented method of the invention includes: Optimize the orthonormal kernels and singular values defining a sparse decomposition of the TCC matrix (in real or Fourier space).

Optimize the incident mutual intensity directly. Take advantage of small variations in J yielding small variations in TCC or intensity, or both.

Optimize source light distribution directly and formulate partial coherence via Abbe's method of statistically independent ray bundles.

Use spatial frequency separation described earlier to advantage.

Solution-Dependent Regularization Method

Figure 3:
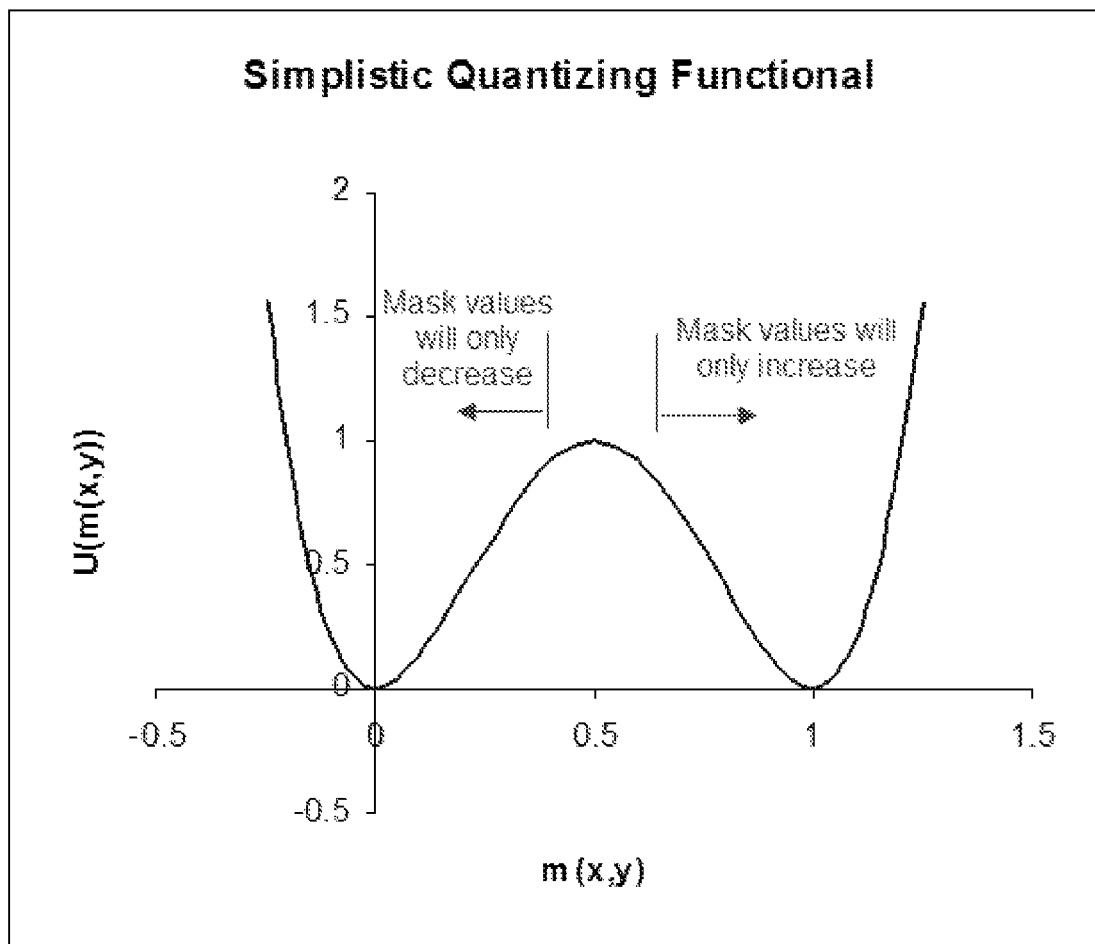
FIG. 3 is a representation of a simplistic quantizing cost functional.
Figure 4:
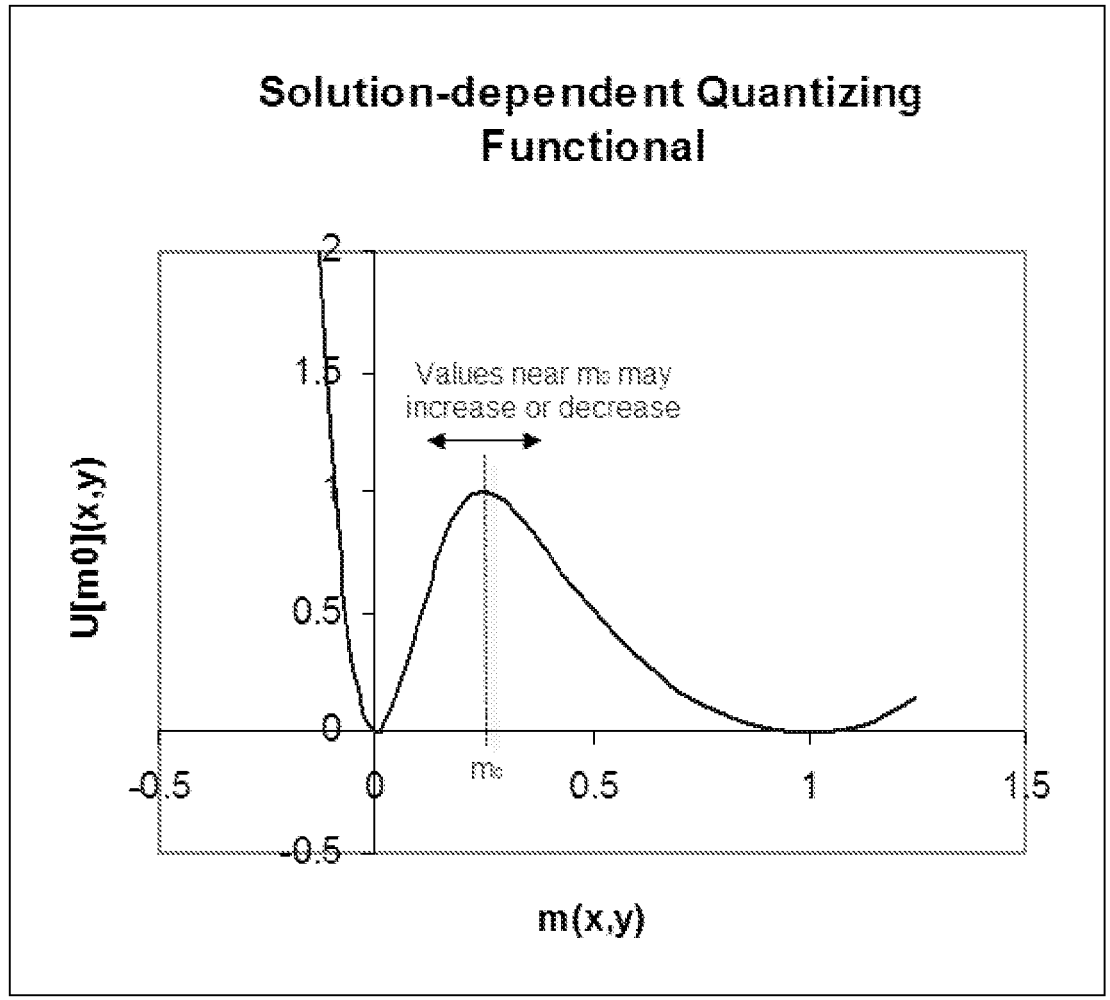
FIG. 4 is a representation of a quantizing cost functional with a form that depends on the evolving mask values.

A simple local functional to regularize a mask function to assume quantized values of 0 and 1 is shown in FIG. 3. The regularization cost over the entire mask area is $$E_{quaint} = \int d^2 r U(m(r))$$

This cost is minimized for masks that only contain the allowed values. The usual regularization procedure mixes-in this cost to the total in some proportion to direct the optimization process to favor quantized masks. For example, as is familiar to one skilled in the solution of inverse problems, one may use $$E = E_{fit} + \gamma_{quant} E_{quant}$$

where $E_{fit}$ is the functional measuring the fit of the predicted print to the target layout, and $\gamma_{quant}$ is the regularization parameter that mixes-in a cost for the mask taking other than the allowed values. Other regularization terms may be summed in similarly. Determining "good" values for such regularization parameters is part of the usual art of inverse methods, but there may not be any mixing value that works well. Furthermore, there may not be any simple regularizing functional with fixed form that can provide acceptable results.

The present invention views regularization as a process in which the cost functional is brought conceptually from being purely concerned with fit-to-data to being purely concerned with regularization. For example, an embodiment may interpolate between the two:

$$E(\eta) = (1-\eta) E_{fit} + \eta E_{quant}$$

As the functional is adjusted, the mask function is adjusted to minimize the total cost. The gradual mixing is a way of an optimally small amount of "work" on the mask to bring it to a fully quantized state. In this way there is no reliance on choosing a single "good" value for $\gamma_{quant}$, which may not exist.

Even with this improvement a simple cost functional may be too biased to yield acceptable results. As shown in FIG. 3, only mask values within a narrow range of the middle value of 0.5 may go up or down in an unbiased fashion, while those a little below are still forced to zero and those a little above are still forced to one.

The present invention removes this bias over a wide range by tailoring the form of the regularizing functional to the mask function as it evolves. For example, starting with a mask function, an embodiment may use a regularization term that is a functional of both the evolving mask and the starting mask:

$$E_{quant} = \int d^2 r U[m_0(r), m(r)]$$

The invention is not limited to such forms. Embodiments may use functionals that are defined self-consistently or depend in various ways on the evolution of the mask during the regularization process. Nevertheless, as a concrete example, an embodiment may use a purely local functional based on a starting mask, such as $$E_{quant} = \int d^2 r U_{m_0(r)}(m(r))$$

Figure 5:
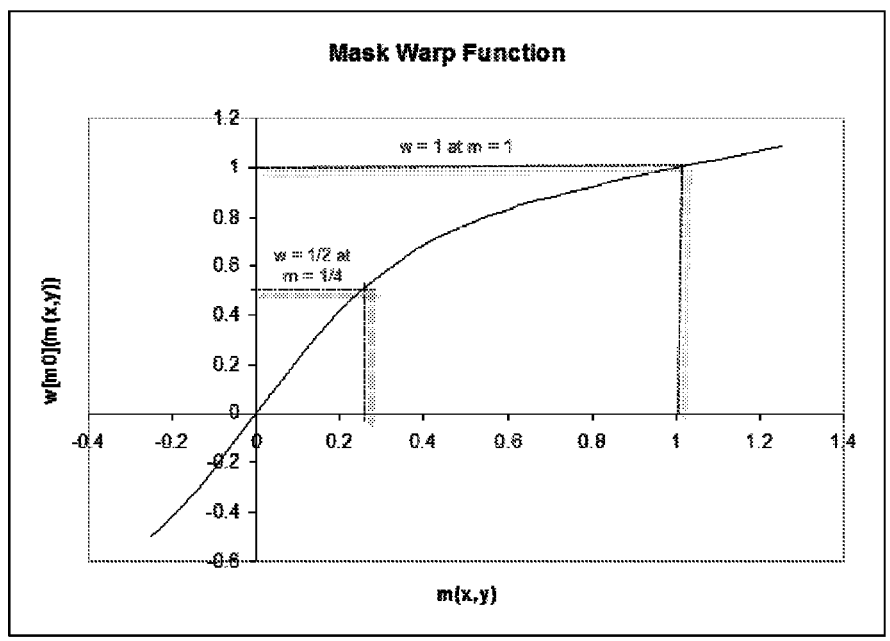
FIG. 5 shows a way of warping a simplistic cost functional to adjust the position of its maximum.

Here, the form of $U_{m_0}$ is chosen to have minima for the allowed mask values and a maximum at $m_0$ for $m_0$ in some range rather than just at ½. FIG. 5 illustrates the shape of U tailored to $m_0 = ¼$. At other points in the plane, U is tailored to a different starting value, namely to the local $m_0(r)$.

One way of tailoring the position of the maximum is through a warping function that maps the current mask values to new ones that move through the minima and the maximum of U in the desired fashion. FIG. 5 shows a sample warp that will keep the minima of the simplistic functional in FIG. 3 at 0 and 1, while remapping the maximum to m=¼. The present invention is not limited to such warping techniques, and embodiments may use other means to tailor a local functional to the mask.

The placing of the maximum "underneath" the starting mask value need only occur for a range of values and not for all values between 0 and 1 in the example. For example, below some minimum mask value $m_{min}$, the position of the maximum may be clamped at $m_{min}$, which will force the mask to zero locally. Conversely, above some maximum mask value $m_{max}$, the position of the maximum may be clamped at $m_{max}$, which will force the mask to one locally. The evolution of the mask in the regions near the allowed values is what will pull or push the intermediate values off the hills placed under them. On the other hand, the strong local bias in the simplistic functional shown in FIG. 1 is removed over the interval $[m_{min}, m_{max}]$.

The present invention encompasses other schemes for tailoring the potential U, including those with some degree of bias.

The present invention is not limited to quantizing a mask function to 0 and 1 and may be generalized to handle other values.

The present invention is not limited to two quantization levels and generalizes to address any number of quantization levels in straightforward ways. In one embodiment, minima are placed at the nearest allowed values and the maximum at a position tailored to the starting mask value. Other embodiments would occur to one skilled in the art.

In a specific implementation, a method includes processing an analytical function for a mask region using a cost function, where the cost function is biased using any bias value in a range, and processing a plurality of analytical functions mask regions using the cost function.

The bias value may be not a middle value. The bias value may be greater than 0.5 and less than 1. The bias value may be less than 0.5 and greater than 0.5. In an implementation, when processing a set of analytical functions mask regions using the cost function, the bias value changes for cost function used for each mask regions.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims

The invention claimed is:

1. A method comprising:
   using an electronic processor, computing a first cost function for a first nonpixelated mask to obtain a first value;
   altering the first nonpixelated mask in a frequency domain to obtain a second nonpixelated mask;
   using the electronic processor, computing the first cost function for the second nonpixelated mask to obtain a second value;
   generating a second cost function by applying a quantization function to the second nonpixelated mask, wherein the quantization function regularizes a mask value of the second nonpixelated mask to one of at least two bias quantization values,
   wherein the second cost function is biased using any bias value in a range, and the quantization function comprises a continuous curve and a shape comprising
   for values less than a first bias value of the at least two bias values, a slope of the continuous curve is negative until a first minima point at the first bias value.

2. The method of claim 1 wherein the quantization function comprises a continuous curve and a shape comprising
   for values greater than the middle value, the slope of the continuous curve is negative until a second minima point at a second bias value of the at least two bias values.

3. The method of claim 1 wherein the quantization function comprises a continuous curve and a shape comprising
   for values greater than the second bias value, the slope of the continuous curve is positive.

4. The method of claim 1 wherein the bias value is not a middle value.

5. The method of claim 1 wherein the bias value is greater than 0.5 and less than 1.

6. The method of claim 1 wherein the bias value is less than 0.5 and greater than 0.

7. The method of claim 1 wherein when processing a plurality of analytical functions mask regions using the cost function, the bias value changes for cost function used for each mask regions.

8. A method comprising:
   (a) using an electronic processor, computing a first cost function for a first nonpixelated mask to obtain a first value;
   (b) altering the first nonpixelated mask in a frequency domain to obtain a second nonpixelated mask;
   (c) using the electronic processor, computing the first cost function for the second nonpixelated mask to obtain a second value;
   (d) generating a second cost function by applying a quantization function to the second nonpixelated mask, wherein the quantization function regularizes a mask value of the second nonpixelated mask to one of at least two bias quantization values; and
   (e) using the electronic processor, computing the second cost function for the second nonpixelated mask to obtain a third value.

9. A method comprising:
   (a) using an electronic processor, computing a first cost function for a first nonpixelated mask to obtain a first value;
   (b) altering the first nonpixelated mask in a frequency domain to obtain a second nonpixelated mask;
   (c) using the electronic processor, computing the first cost function for the second nonpixelated mask to obtain a second value;
   (d) generating a second cost function by applying a quantization function to the second nonpixelated mask, wherein the quantization function regularizes a mask value of the second nonpixelated mask to one of at least two bias quantization values;
   (e) using the electronic processor, computing the second cost function for the second nonpixelated mask to obtain a third value;
   (f) altering the second nonpixelated mask in the frequency domain to obtain a third nonpixelated mask; and
   (g) using the electronic processor, computing the second cost function for the second and third nonpixelated masks to obtain a fourth value.

10. The method of claim 8 wherein the second cost function is biased using any bias value in a range, and the quantization function comprises a curve and a shape comprising
    for values less than a first bias value of the at least two bias values, a slope of the curve is negative until a first minima point at the first bias value.

11. The method of claim 8 wherein the quantization function comprises a curve and a shape comprising
    for values greater than the middle value, the slope of the curve is negative until a second minima point at a second bias value of the at least two bias values.

12. The method of claim 8 wherein the quantization function comprises a curve and a shape comprising
    for values greater than the second bias value, the slope of the curve is positive.

13. The method of claim 10 wherein the quantization function comprises a continuous curve.

14. The method of claim 8 wherein the bias value is not a middle value.

15. The method of claim 8 wherein the bias value is greater than 0.5 and less than 1.

16. The method of claim 8 wherein the bias value is less than 0.5 and greater than 0.

17. The method of claim 8 wherein when processing a plurality of analytical functions mask regions using the first cost function, the bias value changes for the first cost function used for each mask regions.

18. The method of claim 8 wherein when processing a plurality of analytical functions mask regions using the second cost function, the bias value changes for the second cost function used for each mask regions.

19. The method of claim 1 wherein when processing a plurality of analytical functions mask regions using the first cost function, the bias value changes for the first cost function used for each mask regions.

20. The method of claim 1 wherein when processing a plurality of analytical functions mask regions using the second cost function, the bias value changes for the second cost function used for each mask regions.

\* \* \* \* \*